(12) United States Patent
Bellmore et al.

(10) Patent No.: US 11,459,156 B2
(45) Date of Patent: Oct. 4, 2022

(54) FLEXIBLE PACKAGING HAVING MICROEMBOSSING

(71) Applicant: Scholle IPN Corporation, Northlake, IL (US)

(72) Inventors: David Bellmore, DeWitt, MI (US); Teresa Bernal-Lara, Lincolnshire, IL (US)

(73) Assignee: Scholle IPN Corporation, Northlake, IL (US)

( * ) Notice: Subject to any disclaimer, the term of this patent is extended or adjusted under 35 U.S.C. 154(b) by 0 days.

(21) Appl. No.: 15/936,395

(22) Filed: Mar. 26, 2018

(65) Prior Publication Data
US 2018/0273270 A1    Sep. 27, 2018

Related U.S. Application Data

(60) Provisional application No. 62/476,037, filed on Mar. 24, 2017.

(51) Int. Cl.
| | | |
|---|---|---|
| *B65D 77/06* | (2006.01) | |
| *B65D 33/00* | (2006.01) | |
| *B29C 59/02* | (2006.01) | |
| *B29L 31/00* | (2006.01) | |
| *B65B 3/04* | (2006.01) | |

(52) U.S. Cl.
CPC ............ *B65D 77/062* (2013.01); *B65B 3/045* (2013.01); *B65D 33/004* (2013.01); *B65D 77/065* (2013.01); *B29C 59/022* (2013.01); *B29C 2059/023* (2013.01); *B29L 2031/7128* (2013.01); *B65D 2203/00* (2013.01); *B65D 2231/001* (2013.01); *B65D 2275/00* (2013.01); *B65D 2577/041* (2013.01)

(58) Field of Classification Search
CPC .. B65D 77/062; B65D 33/004; B65D 77/065; B65D 83/0805; B65D 75/008; B65D 75/5866; B65B 3/045; C08L 23/06; C08L 23/0815; C08J 5/18; B31F 1/07; B31F 2201/0761; B31F 2201/0733; B31B 50/88
USPC ................. 229/117.27; 206/494, 438, 524.6; 383/66, 86, 93, 95, 100, 105; 428/220, 428/43, 500; 222/92
See application file for complete search history.

(56) References Cited

U.S. PATENT DOCUMENTS

| | | | | |
|---|---|---|---|---|
| 4,979,613 | A * | 12/1990 | McLaughlin | B65D 33/24 206/233 |
| 5,636,742 | A * | 6/1997 | Hoffrichter | A45C 11/24 150/149 |
| 5,657,516 | A * | 8/1997 | Berg | A44B 18/0053 24/306 |
| 5,728,086 | A * | 3/1998 | Niedospial, Jr. | A61J 1/10 604/262 |
| 6,715,644 | B2 * | 4/2004 | Wilford | B65D 77/062 222/107 |

(Continued)

FOREIGN PATENT DOCUMENTS

JP    2016210452 A  * 12/2016

*Primary Examiner* — Christopher R Demeree
(74) *Attorney, Agent, or Firm* — The Watson IP Group, PLC; Jovan N. Jovanovic

(57) ABSTRACT

A flexible bag having an inner ply and an outer ply. The inner ply has a front panel and a back panel. At least one of the front and back panels having a microembossing on an inner surface thereof. A bag in box packaging having the flexible bag is likewise disclosed.

9 Claims, 4 Drawing Sheets

(56) References Cited

U.S. PATENT DOCUMENTS

| | | | | |
|---|---|---|---|---|
| 6,984,278 | B2* | 1/2006 | Anderson | B32B 38/06 |
| | | | | 156/209 |
| 7,357,276 | B2* | 4/2008 | Savage | B65D 75/5877 |
| | | | | 222/92 |
| 9,399,540 | B2* | 7/2016 | Bushman | B65D 75/5833 |
| 9,981,793 | B2* | 5/2018 | Kenmotsu | B65D 75/008 |
| 10,752,415 | B2* | 8/2020 | Darin | B29C 43/021 |
| 2004/0251163 | A1* | 12/2004 | Conde | B65D 83/0805 |
| | | | | 206/494 |
| 2007/0114885 | A1* | 5/2007 | Benslimane | B81B 3/007 |
| | | | | 310/311 |
| 2009/0204090 | A1* | 8/2009 | Dennis | A61F 13/4702 |
| | | | | 604/385.02 |
| 2009/0304309 | A1* | 12/2009 | Hayes | A44B 18/0053 |
| | | | | 383/63 |
| 2011/0028929 | A1* | 2/2011 | Hopkins | A61F 13/51394 |
| | | | | 604/383 |
| 2012/0016328 | A1* | 1/2012 | Shi | A61F 13/15252 |
| | | | | 604/385.01 |
| 2012/0315454 | A1* | 12/2012 | Wang | B29D 7/01 |
| | | | | 428/220 |
| 2013/0323453 | A1* | 12/2013 | Hirasawa | D21H 27/005 |
| | | | | 428/43 |
| 2015/0165389 | A1* | 6/2015 | McGinniss | B01D 61/002 |
| | | | | 523/457 |
| 2015/0360837 | A1* | 12/2015 | Perez-Prat Vinuesa | |
| | | | | C11D 17/042 |
| | | | | 206/524.7 |
| 2016/0347919 | A1* | 12/2016 | Wang | C08L 51/06 |
| 2017/0282635 | A1* | 10/2017 | Boegli | B31F 1/07 |

* cited by examiner

FLEXIBLE PACKAGING HAVING MICROEMBOSSING

CROSS-REFERENCE TO RELATED APPLICATION

This application claims priority from U.S. Pat. App. Ser. No. 62/476,037 entitled "Flexible Packaging Having Microembossing" filed Mar. 24, 2017, the entire disclosure of which is hereby incorporated by reference in its entirety.

BACKGROUND OF THE DISCLOSURE

1. Field of the Disclosure

The invention relates in general to flexible packaging, and more particularly, to flexible packaging having microembossing. Such microembossing has been found to minimize adhesion of the flowable material contained within the flexible bag, and, therefore aid the dispensing of the same (i.e., minimizing retained flowable material in a dispensing operation).

2. Background Art

The use of bag in box packaging is ubiquitous. Generally, such packaging comprises a flexible bag made from a plurality of panels of polymer film. The panels are coupled together through a plurality of seals to form a generally fluid tight cavity. A spout may be provided on one of the panels to provide ingress into the fluid tight cavity. The flexible bag is then placed within a rigid outer container.

Such bags are generally filled with a flowable material and are generally shipped and stored in the rigid outer container. Eventually, the flowable material is dispensed from the flexible bag. Problematically, a number of different flowable materials that are stored and dispensed from such flexible bags tend to adhere, stick or otherwise remain in contact with the inner walls of the flexible bag. As such, it is often difficult to completely empty the flexible bag and a more than inconsequential amount of flowable material remains within the package when the dispensing method becomes ineffective as to the removal of additional fluid.

SUMMARY OF THE DISCLOSURE

The disclosure is directed to a flexible bag having an inner ply and an outer ply. The inner ply has a front panel and a back panel. At least one of the front and back panels having a microembossing on an inner surface thereof.

A number of different configurations for the flexible bag are disclosed, including multi ply pillow bags. Of course, single ply bags are likewise contemplated.

A number of different microembossing (also referred to herein as micro patterns) are disclosed, many of which are supplied by Hoowaki, LLC. Some of the specific disclosed patterns are identified by Hoowaki part numbers.

Such structures can be utilized on one or both of the inner surfaces of the inner plies that face flowable material. Different combinations may be utilized, and, additional configurations of the microembossing are contemplated.

Furthermore, it is contemplated that such microembossing limit adhesion of flowable material to the flexible bag, aiding dispensing thereof. Such structures are generally not directed to the formation of channels to aid evacuation, but rather, as indicated, adhesion resistance.

In some aspects of the disclosure, the disclosure is directed to a flexible bag comprising an inner ply and an outer ply. The inner ply has a front panel and a back panel, at least one of the front and back panels having a microembossing on an inner surface thereof.

In some configurations, the microembossing further comprises a size, a pitch and a depth. The microembossing has one of the size, pitch and depth that is less than 25 µm, and more preferably, less than 10 µm.

In some configurations, the depth is less than 25 µm, and more preferably, less than 10 µm.

In some configurations the depth is less than 10 µm and preferably 5 µm or less.

In some configurations, the microembossing comprises a stacked microembossing, having at least two microfeatures, a third microfeature having a size, a pitch and a depth, and a second microfeature. The third microfeature has one of a size, pitch and depth that is less than 25 µm, and more preferably, less than 10 µm.

In some configurations, the second microfeature comprises a depth of at least 25 µm, and more preferably at least 30 µm.

In some configurations, the second microfeature comprises a size and a pitch, the pitch being at least 35 µm and more preferably 50 µm.

In some configurations, the microembossing has a land percentage, with the land percentage being at between 20% and 30%.

In another aspect of the disclosure, the disclosure is directed to a bag in box packaging comprising a rigid outer container, and a flexible bag. The flexible bag is positioned within the rigid outer container. The flexible bag comprises an inner ply and an outer ply. The inner ply has a front panel and a back panel. At least one of the front and back panels having a microembossing on an inner surface thereof.

In some configurations, the microembossing of the flexible bag further comprises a size, a pitch and a depth. The microembossing has one of the size, pitch and depth that is less than 25 µm, and more preferably, less than 10 µm.

In some configurations, the depth is less than 25 µm, and more preferably, less than 10 µm.

In some configurations, the depth is less than 10 µm and preferably 5 µm or less.

In some configurations, the microembossing comprises a stacked microembossing, having at least two microfeatures, a third microfeature having a size, a pitch and a depth, and a second microfeature. The third microfeature has one of a size, pitch and depth that is less than 25 µm, and more preferably, less than 10 µm.

In some configurations, the second microfeature comprises a depth of at least 25 µm, and more preferably at least 30 µm.

In some configurations, the second microfeature comprises a size and a pitch, the pitch being at least 35 µm and more preferably 50 µm.

In some configurations, the microembossing has a land percentage, with the land percentage being at between 20% and 30%.

In some configurations, the flexible bag further comprises a spout extending through the inner ply and the outer ply so as to be in fluid communication with the cavity defined by the flexible bag.

In another aspect of the disclosure, the disclosure is directed to a flexible bag comprising a front panel, a back panel and a spout. At least one of the front panel and back panels having a microembossing on an inner surface thereof, with the spout providing ingress into the cavity.

In some configurations, the microembossing comprises a stacked microembossing, having at least two microfeatures, a third microfeature having a size, a pitch and a depth, and a second microfeature. The third microfeature has one of a size, pitch and depth that is less than 25 μm, and more preferably, less than 10 μm.

In some configurations, the second microfeature comprises a depth of at least 25 μm, and more preferably at least 30 μm.

BRIEF DESCRIPTION OF THE DRAWINGS

The disclosure will now be described with reference to the drawings wherein.

DETAILED DESCRIPTION OF THE DISCLOSURE

Figure 1:
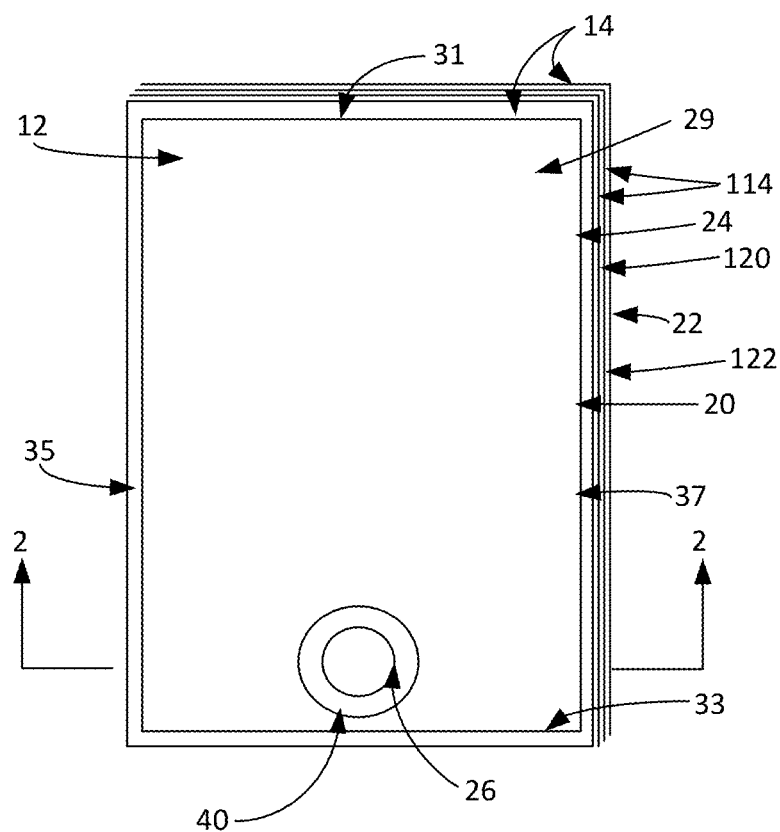
FIG. 1 of the drawings is a perspective view of a flexible bag of the present disclosure.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
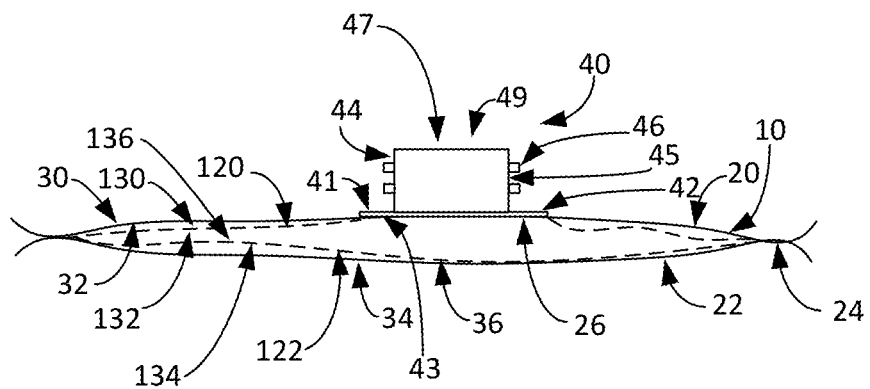
FIG. 2 of the drawings is a cross-sectional view of a flexible bag of the present disclosure, showing, in particular, the structure thereof, taken generally about lines 2-2 of FIG. 1.
Figure 3:
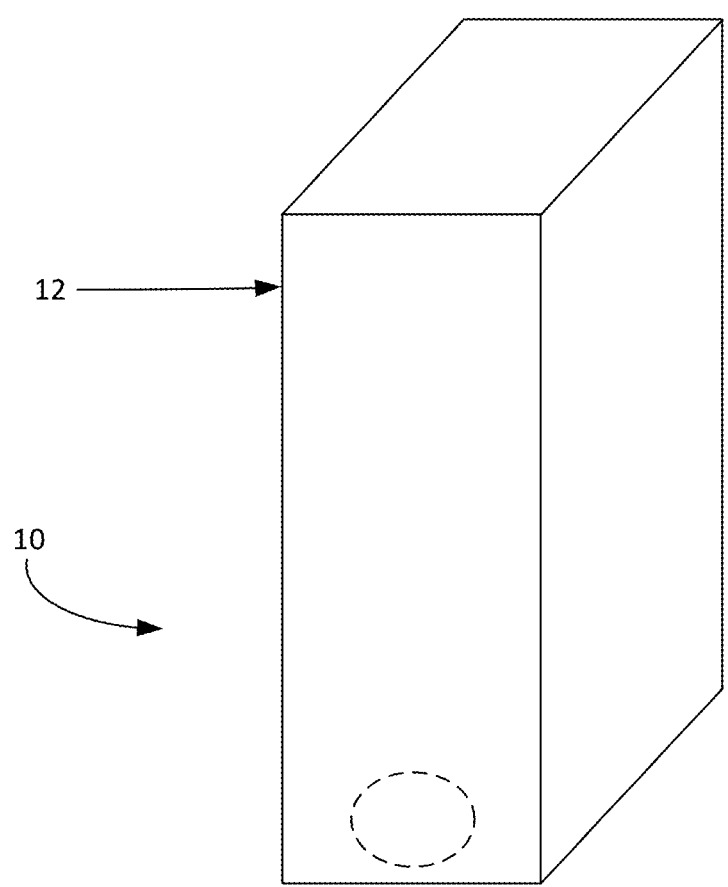
FIG. 3 of the drawings is a perspective view of a bag-in-box package having a rigid outer container and the flexible bag (not shown) therewithin.
Figure 4E:
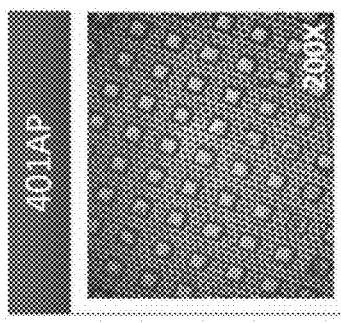
FIGS. 4a through 4i of the drawings are magnified images of different microstructures configured for use with the flexible bag, with the exception of 4a which is a smooth configuration that does not include any microstructures and was used for comparison purposes as a control.
Figure 4D:
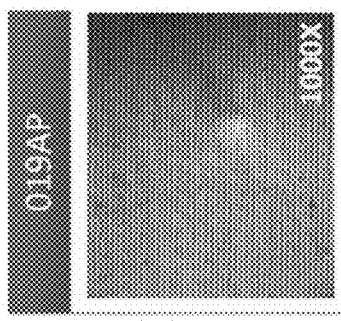
Figure 4C:
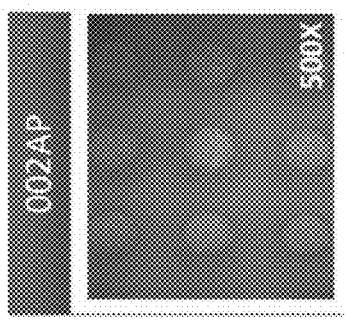
Figure 4B:
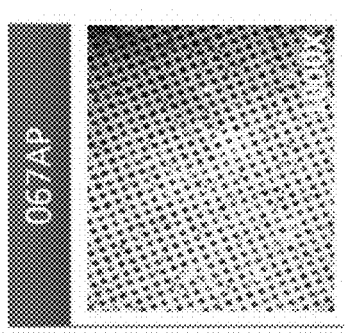
Figure 4A:
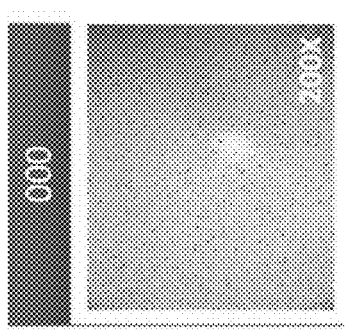
Figure 4I:
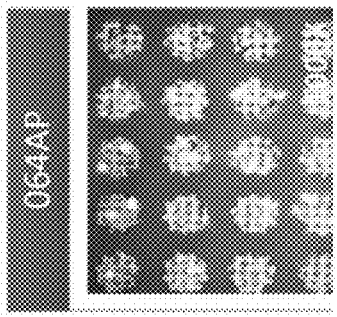
Figure 4H:
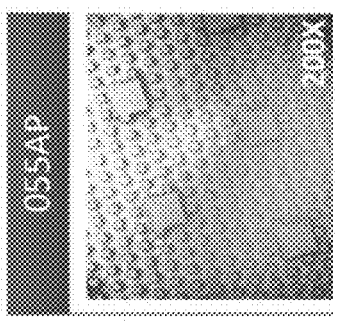
Figure 4G:
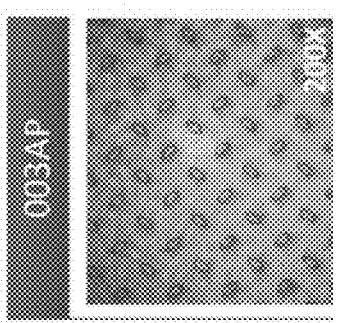
Figure 4F:
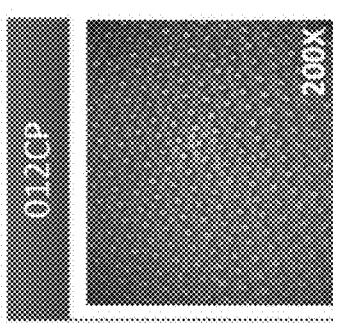
Figure 5:
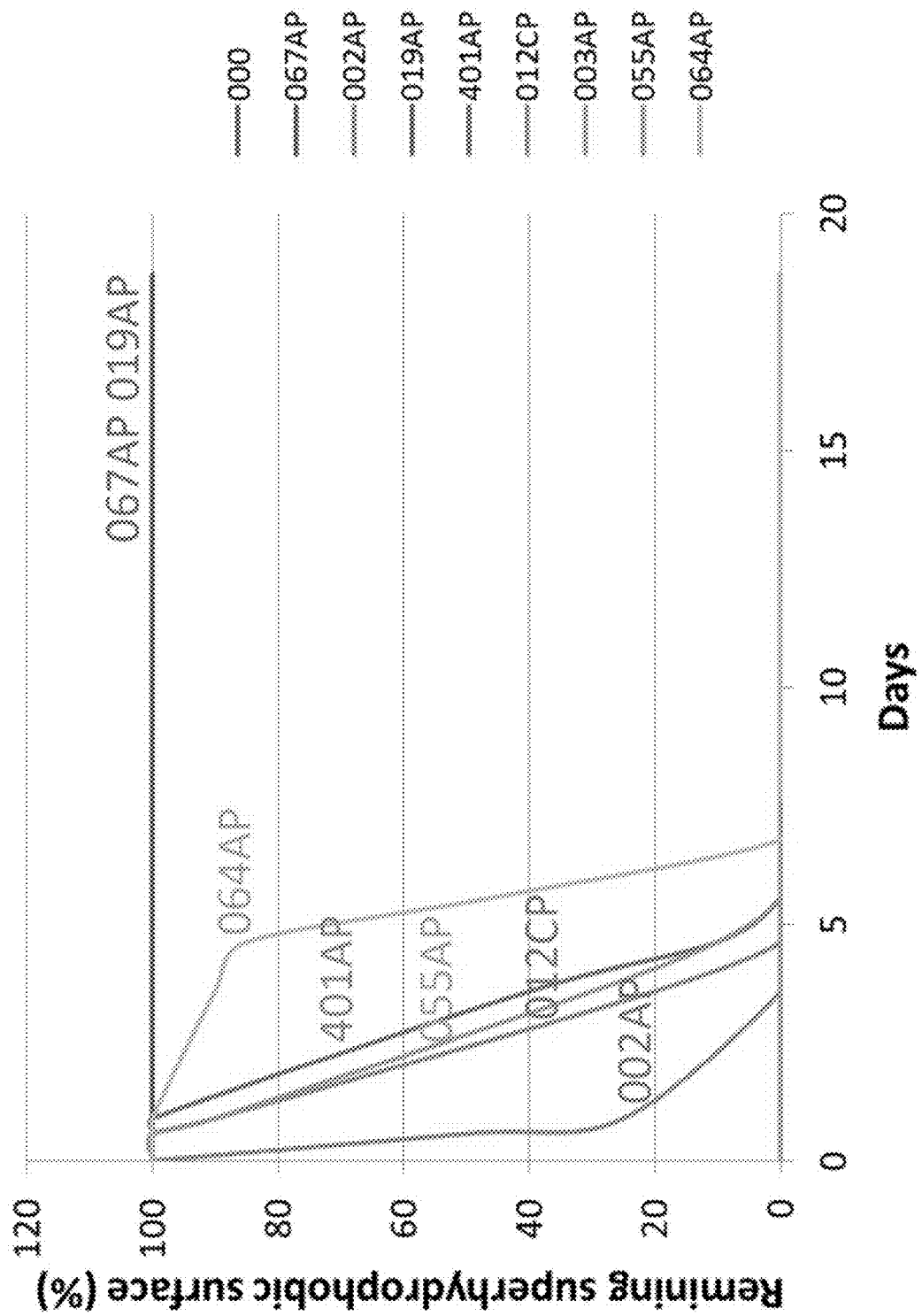
FIG. 5 of the drawings is a chart setting forth hydrostatic performance of the films.

Referring now to the drawings and in particular to FIGS. 1 and 2, flexible packaging of the present disclosure is shown at 12. The bags 12 can be used alone, or in combination with outer rigid containers 10, such as, in association with bag-in-box packaging, shown in FIG. 3. In such applications, the bags may be used to store and dispense flowable material, including, but not limited to liquids, gels, syrups, such as soft drink syrup, beverages, such as wine, purees, yogurt, among other flowable material. It is contemplated that such a flowable material may comprise any number of different viscosities, and may include a solids content. The foregoing examples of flowable material are meant to be illustrative, and not deemed to be limiting.

One illustrative bag is shown in FIGS. 1 and 2 as comprising a commonly known two ply pillow type bag. Such a bag includes outer ply 14, which includes, front panel 20 and back panel 22. Front panel 20 includes outer surface 30 and inner surface 32. The back panel 22 includes outer surface 34 and inner surface 36. The front and back panel are positioned in an overlying orientation so that the inner surfaces face each other.

The inner ply 114 includes front panel 120 and back panel 122. The front panel 120 includes outer surface 130 and inner surface 132. The back panel 122 includes outer surface 134 and inner surface 136. The front and back panel of the inner ply are positioned in an overlying orientation so that the inner surfaces abut each other, with the outer surfaces abutting the respective front and back panel of the outer ply.

The panels are then coupled together by way of seals 24. In the case of a pillow type container, the seals 24 include a top seal 31, bottom seal 33, first side seal 35 and second side seal 37. The seals are generally perpendicular to adjacent seals and parallel to opposing seals to generally define a square or rectangular configuration, thereby defining a generally square or rectangular cavity 29 within the inner ply. The seals may be formed through the application of heat, or through other procedures, including, but not limited to RF welding, ultrasonic welding, adhesive, among others. The disclosure is not limited to any particular manner of attachment of the panels.

For many pillow type containers, an opening 26 is provided through the front panels of both the inner and outer plies, proximate, but spaced apart from the bottom seal 33. A spout 40 can be coupled thereto in sealed engagement. In certain embodiments, multiple spouts may be provided, one, for example, for dispensing, and one for filling. In other embodiments, spouts may be positioned along the seals so as to extend between the panels. The film is configured for use in association with multiple configurations of spouts, as well as in embodiments that do not require spouts.

One type of spout is shown in FIG. 2 as comprising a base flange 42, and upstanding wall 44 extending from the base flange. The base flange includes top surface 41 and bottom surface 43 opposite top surface 41. Generally the base flange is substantially planar and generally perpendicular to the upstanding wall 44. Either one of the top and bottom surfaces may be sealed to the front panel about opening 26, through a heat seal. Of course, other sealing methods, such as those identified above may be utilized in place of heat sealing.

The upstanding wall includes an outer surface 45 which includes grasping flanges, such as grasping flange 46 extending about the outer surface. Generally, these grasping flanges are disposed in a spaced apart orientation along the outer surface, generally parallel to the base flange 42. Of course, other configurations are likewise contemplated. The upstanding wall defines a passageway, which is generally of a circular configuration, terminating at opening 49 spaced distally from the base flange 42. Of course, other cross-sectional configurations are contemplated, and the disclosure is not limited to any particular configuration of the spout.

It will be understood that any number of different members may be coupled to the spout described above. For example, a cap or a dispensing fitment may be coupled to the above configuration. Such connectors may include those disclosed in U.S. Pat. No. 7,387,277 issued to Verespej et al, U.S. Pat. No. 7,469,522 issued to Verespej et al, U.S. Pat. No. 7,114,625 issued to Jones, et al, U.S. Pat. No. 8,448,799 issued to Thurman, as well as various Quick connect, disconnect fittings (QCD) that are utilized in association with soft drink syrups among others, wherein the product is evacuated. It is also contemplated that dispensers such as those disclosed in U.S. Pat. Nos. 4,619,377 and 6,978,981 both of which are issued to Roos as well as U.S. Pat. Nos.

6,045,119; 6,296,157 and 6,360,925 issued to Erb, U.S. Pat. No. 8,336,743 issued to Bellmore, U.S. Pat. No. 7,240,811 issued to Roser may be used. Additionally, it will be understood that the spout or the cavity may further include different structures to aid in the dispensing of flowable material. Among such structures, it is contemplated that the structures coupled to the spout, including but not limited to those shown in U.S. Pat. No. 5,749,493 issued to Boone et al; U.S. Pat. No. 5,941,421 issued to Overman et al and U.S. Pat. No. 6,102,252 issued to Overman et al and U.S. Pat. No. 4,138,036 issued to Bond are contemplated for use. Each of the foregoing references are incorporated by reference in their entirety.

It will be understood that while a pillow type bag is shown, in other configurations, the bag may comprise a gusseted bag wherein four panels are coupled together to form a generally rectangular shaped bag. One such configuration is shown in U.S. Pat. No. 5,788,121 issued to Sasaki et al. Another such configuration is shown in U.S. Pat. No. 6,783,277 issued to Edwards. The foregoing patents are incorporated by reference in their entirety.

It is contemplated that the inner ply 114, and, in particular, at least one, or both of the front panel 120 and the back panel 122 thereof, include microembossings (termed microfeatures) which minimize adhesion of the flowable material placed within the cavity 29. While not limited thereto, the microembossings may incorporate teachings from any one of U.S. Pat. App. Pub. No. 2015/0368838 entitled Microstructured High Friction Surface for High Friction to Fabric, Yarn and Fibers, U.S. Pat. App. Pub. No. 2011/0089604 entitled Method of Manufacturing Products Having A Metal Surface, U.S. Pat. App. Pub. No. 2011/00319183 entitled Method for Making Microstructured Objects, U.S. Pat. App. Pub. No. 2011/0311764 entitled Multi-Scale, Multi-functional Microstructured Material, U.S. Pat. App. Pub. No. 2015/0298378 entitled System and Method for Extruding Parts Having Microstructures, U.S. Pat. App. Pub. No. 2015/0328815 entitled System and Method for Extruding Parts having Microstructures, and, U.S. Pat. App. Pub. No. 2017/0014111 entitled Microstructured Surface, all of which are assigned to Hoowaki, LLC. The entire disclosure of each one of the foregoing applications is hereby incorporated by reference in its entirety. The '111 publication is attached as Appendix A.

As set forth in FIGS. 4(a) through 4(i), a number of different disclosures are contemplated. The chart below summarizes the different structures of each of the different films contemplated for the inner ply 114. The micro patterns are available from Hoowaki, LLC of Greenville, S.C.

| Micro Pattern ID | Size/Pitch/Depth (μm) + - denotes stacking of layered micro features as set forth in the '111 publication X - denotes maximum and minimum dimensions of a cross section | Land % |
| --- | --- | --- |
| 000 (control) | N/A | N/A |
| 067AP | 3/6/5 | 45% |
| 002AP | 50/100/70 | 23% |
| 019AP | 0.8/1.6/1.6 | 50% |
| 401AP | 50 + 10/100 + 20/25 | 32% |
| 012CP | 25/50/50 | 25% |
| 003AP | 25 × 50/100/70 | 7% |
| 055AP | 100 + 25/300 + 50/50 | 32% |
| 064AP | 35 + 3/35 + 6/30 + 5 | 73% |

In the foregoing chart, the size generally corresponds to a diameter or a surface maximum and minimum, the pitch is the spacing between microstructure (wherein a plurality of microstructures forms a microfeature/micro feature) and the depth is height of the microstructure from its emanation surface. Additionally, as set forth in the '111 publication, the microembossing may comprise a stacked microembossing of the type having a first, second, third and/or fourth set of microfeatures. For example, a first set as set forth in the incorporated '111 application, may comprise an undulation having a size range of 100 microns to 999 microns, for example. A second set of microfeatures may comprise a range of about 10 microns to 100 microns having a height to width aspect ratio of less than 5 and a minimum spacing of 1 micron. A third set of microfeatures may comprise can share the same spacing and aspect ratio but may have size of 0.4 micron to about 10 microns. The fourth set of microfeatures may be disposed on side surfaces of the second set of microfeatures, such as flutes and ribs that extend vertically along the side surface of the outside circumference of each of the microstructures comprising the second set of micro features. Generally, these are preferably within a range of 0.4 microns and 10 microns. Generally, these are preferably compression molded simultaneously with the first, second and third sets of microfeatures on the substrate.

These different structures were tested in several different manners. Certain of the tests determined the speed at which droplets of Greek yogurt could move across the micropattern. It was determined that land percentages between 20% and 30% exhibit improved performance as to the traversing of a droplet thereacross. Additionally, it appeared that pattern depth further had an effect on the movement speed, namely, the larger depth appeared to improve performance. In this test, 012CP, 055AP, 002AP and 003AP performed well.

A second test was run submerging the different materials in Greek yogurt then determining the percentage of clean surface (that is, where Greek yogurt was not present) that remained. IT was determined that 055AP had 50% of its surface clean. Patterns 002AP, 064AP, 012CP and 003AP had about 30% of their surfaces clean. No sliding after submersion was observed for patterns 067AP and 019AP as well as with 000AP.

Another test was run to determine the performance of the films when exposed to hydrostatic pressure. In particular, samples were taped to the bottom of a Pack-Vac that was filled with water at a very slow rate to 14.5 level in height (this was generally equivalent to 0.5 psi of pressure). The effect of water pressure on the pattern surface was recorded through filling and during the 19 days. A chart showing the results is set forth in FIG. 4.

Under the hydrostatic pressure, the surface lasted for at least 19 days for patterns 067AP and 019AP. The surface lasted between four and seven days for patterns 064AP, 401AP, 055AP, 012CP and 002AP. Pattern 064AP lasted the longest. Pattern 003AP lost its surface during filling.

From this data, it was determined that some microstructures are well suited for use in the bag in box configurations. For example, it was determined, surprisingly, that suitability for use in bag-in-box environments, having a feature that is less than 10 μm (and in some configurations 5 μm or less) is preferred, and that as all of the features in excess of 25 μm demonstrate a reduced performance.

Additionally, it has been determined that the relatively deeper features, having a depth of preferably more than 30 μm and more preferably 50μ or greater, provide improved performance on the evacuation of thicker materials, such as, for example, Greek yogurt. Furthermore, it has been determined that a land percentage of between 20% and 30% yields improved results as to droplet movement, that may translate to evacuation improvement. The land percentage, however, is likewise affected by the depth of the features. It seems, however, that even with these features, having a feature that is less than 25 µm and more preferably below 10 µm allows for the maintenance of the hydrophobic surface.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A flexible bag comprising:
    an inner ply, an outer ply, and a spout;
    wherein the inner ply has a front panel and a back panel, at least one of the front and back panels having a microembossing on an inner surface thereof, the inner ply being insoluble in water to store a flowable material within the flexible bag and the microembossing limiting adhesion of the flowable material within the flexible bag to aid evacuation of the flowable material from the spout, the microembossing having a land percentage, with the land percentage being approximately between 20% and 30%; and
    wherein the microembossing comprises a size, a pitch and a depth, the depth being less than 25 µm.

2. The flexible bag of claim 1 wherein one of the size and the pitch is less than 25 µm.

3. The flexible bag of claim 1 wherein the depth is less than 10 µm.

4. The flexible bag of claim 1 wherein the microembossing comprises a stacked microembossing, having at least two microfeatures, a third microfeature having a size, a pitch and a depth, wherein the third microfeature has one of a size, pitch and depth that is less than 25 µm, and a second microfeature.

5. The flexible bag of claim 4 wherein the second microfeature comprises a depth of at least 25 µm.

6. The flexible bag of claim 4 wherein the second microfeature comprises a size and a pitch, the pitch being at least 35 µm.

7. A flexible bag comprising:
    a front panel and a back panel, at least one of the front panel and back panels having a microembossing on an inner surface thereof, the flexible bag being insoluble in water to store a flowable material therein, the microembossing having a land percentage, with the land percentage being approximately between 20% and 30%; and
    a spout providing ingress into the cavity, the microembossing limiting adhesion of the flowable material within the flexible bag to aid evacuation of the flowable material from the spout;
    wherein the microembossing comprises a size, a pitch and a depth, wherein the depth is less than 25 µm.

8. The flexible bag of claim 7 the microembossing comprises a stacked microembossing, having at least two microfeatures, a third microfeature having a size, a pitch and a depth, wherein the third microfeature has one of a size, pitch and depth that is less than 25 µm, and a second microfeature.

9. The flexible bag of claim 8 wherein the second microfeature comprises a depth of at least 25 µm.

* * * * *